(No Model.)
J. W. HOWELL.
Device for Coating Eggs.
No. 241,492.      Patented May 17, 1881.
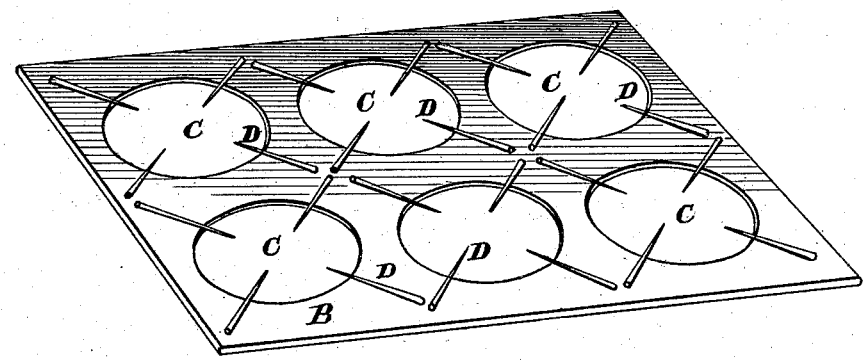
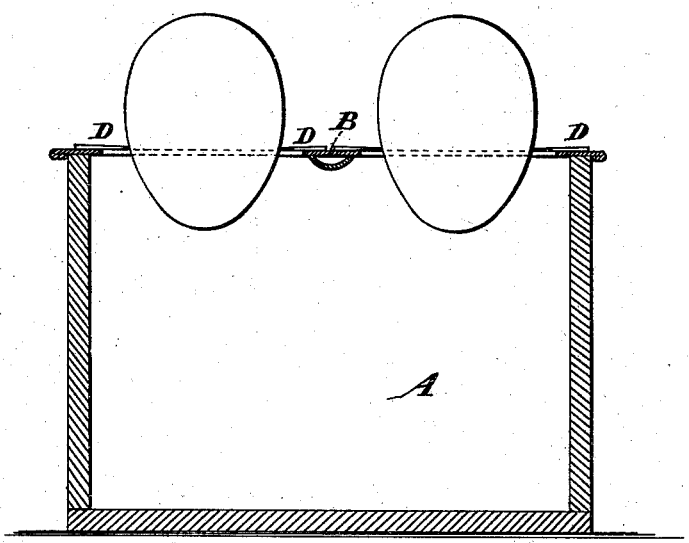
Witnesses.
A. Ruppert
C. M. Connell
J. W. Howell
Inventor.
Holloway & Blanchard
Att'ys

UNITED STATES PATENT OFFICE.

JOHN W. HOWELL, OF INDIANAPOLIS, INDIANA.

DEVICE FOR COATING EGGS.

SPECIFICATION forming part of Letters Patent No. 241,492, dated May 17, 1881.

Application filed February 23, 1881. (No model.)

*To all whom it may concern:*

Be it known that I, JOHN W. HOWELL, a citizen of the United States, residing at Indianapolis, in the county of Marion and State of Indiana, have invented certain new and useful Improvements in Devices for Holding Eggs while being Coated; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in devices for supporting eggs while being coated with shellac or other substance for preserving them; and the object of my improvement is to provide a rest or support for the eggs, so constructed as to cover or come in contact with the least possible amount of the surface of the eggs, and thus permit the varnish or other material to come in contact with the entire surface thereof. I attain this object by the device illustrated in the accompanying drawings, in which—

Figure 1 is a perspective view of the rest, showing the apertures through which a portion of the eggs pass, and also the points upon which they rest while the varnish or other coating substance is being applied; and Fig. 2 is a sectional elevation, showing a stand upon which the supporting-plate rests, the plate in position, and eggs as they appear while receiving their coating.

Similar letters refer to similar parts in both of the figures.

In constructing devices of this character, I provide any suitable box or frame, A, that will support a plate, B, which may be made of wood, metal, or any other substance that has sufficient strength to support the eggs that are placed upon it. The plate, which, by preference, is made of metal, is provided with a series of holes, C C, the diameter of which may be about equal to the greatest diameter of the eggs.

For the purpose of preventing the eggs from resting upon the plate B, there are placed upon the upper surface thereof a number of sharp-pointed rods, of metal or other substance, they being fastened thereto so as to project over a portion of the apertures and be directed toward their centers, each hole having around it a sufficient number to hold the eggs placed thereon in position. The pointed rods above alluded to are designated by the letters D D, they being so placed that each one of them shall point toward the center of the hole around which they are arranged, their points being such distance apart as to allow the smallest end of an egg to pass down between them, but not so far as to allow the entire egg to pass through, such arrangement being clearly shown in Fig. 2 of the drawings.

It will be seen that owing to the fact that those portions of the rods upon which the eggs rest are reduced to points, they will cover but a small fraction of the surface of the eggs, but will leave the entire surface, with the exception of the infinitesimal parts under the points, to be covered by the coating, which is an essential feature in preparing eggs to be kept for any considerable length of time.

In preserving eggs they are placed upon these points, as shown in Fig. 2, when a varnish, made of shellac and alcohol, or some other liquid substance, is poured over them, which comes in contact with their entire surfaces, and the pores or cells of the shell are thus filled with the varnish and the air excluded from their interiors.

Having thus described my invention, what I claim, and desire to secure by Letters Patent, is—

A rest for supporting eggs while being coated with varnish or other air-excluding substance, consisting of a plate, B, of metal or other suitable substance, having in it a series of holes for the insertion of the eggs, and also being provided with a series of pointed rods for supporting them, such rods being attached to the plate, substantially as set forth.

In testimony whereof I affix my signature in presence of two witnesses.

JOHN W. HOWELL.

Witnesses:
AQUILLA Q. JONES,
GEO. A. THORNTON.